United States Patent
Ebata et al.

(10) Patent No.: US 6,715,065 B1
(45) Date of Patent: Mar. 30, 2004

(54) MICRO PROGRAM CONTROL METHOD AND APPARATUS THEREOF HAVING BRANCH INSTRUCTIONS

(75) Inventors: Atsushi Ebata, Hatano (JP); Michitaka Yamamoto, Moshida (JP); Takeshi Kato, Akishima (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/539,898

(22) Filed: Mar. 31, 2000

(30) Foreign Application Priority Data

Apr. 9, 1999 (JP) ............................. 11-102157

(51) Int. Cl.[7] ............................. G06F 9/00; G06F 9/44
(52) U.S. Cl. ..................... 712/245; 712/247; 712/235
(58) Field of Search ................................ 712/235, 246, 712/247, 248, 245

(56) References Cited

U.S. PATENT DOCUMENTS

| | | | | |
|---|---|---|---|---|
| 3,800,293 A | * | 3/1974 | Enger et al. | 712/247 |
| 3,979,729 A | * | 9/1976 | Eaton et al. | 712/211 |
| 4,179,731 A | * | 12/1979 | Yamazaki | 712/219 |
| 4,373,180 A | * | 2/1983 | Linde | 712/239 |
| 4,494,195 A | | 1/1985 | Noguchi et al. | 364/200 |
| 6,112,299 A | * | 8/2000 | Ebcioglu et al. | 712/236 |

OTHER PUBLICATIONS

Hennessy, John L. and Patterson, David A. Computer Architecture: A Quantitative Approach. Second Edition. San Francisco, California: Morgan Kaufman Publishers, Inc. ©1996. Chapter 6, pp. 484–495.*

* cited by examiner

Primary Examiner—Eddie Chan
Assistant Examiner—Aimee J. Li
(74) Attorney, Agent, or Firm—Reed Smith LLP; Stanley P. Fisher, Esq.; Juan Carlos A. Marquez, Esq.

(57) ABSTRACT

In an information processing apparatus which executes micro programs having branch instructions, two micro instructions are read at once, each of which instructions comprises either a field for specifying the branch target address in the following Nth ($N \geq 2$) cycle from the reading cycle of the micro instruction, or a field for determining the termination of micro program in the following Nth ($N \geq 2$) cycle, and a control field for controlling the execution in the next cycle.

11 Claims, 16 Drawing Sheets

Prior Art

Prior Art

Prior Art

Prior Art

Prior Art

Prior Art

MICRO PROGRAM CONTROL METHOD AND APPARATUS THEREOF HAVING BRANCH INSTRUCTIONS

BACKGROUND OF THE INVENTION

The present invention is directed to an information processing apparatus incorporating micro program control method, more specifically to a micro program control method and apparatus thereof for data processing with microprogram control, which allows high speed fetching of micro instructions from control storage without increasing the program capacity of microprograms.

A first example of the Prior Art technology performs micro program control, which has a field for specifying the branch target address of next clock cycle (referred to as a cycle, hereinbelow) by a micro instruction and a field for controlling a processor.

Now referring to FIGS. 5 through 8 an embodiment in accordance with the first example of the Prior Art technology and the execution procedure will be described.

Referring at first to FIG. 6, there is shown a format of micro instruction in accordance with first example of the Prior Art technology, which instruction comprises a page address field 600 of branch target of the micro instruction, an end judgment field 601 for determining whether or not the micro program terminates in next cycle, a branch condition field 602 for use in the branch judgment, and a control field 603 for controlling the execution in next cycle. In first example of the Prior Art technology, a pair of micro instructions composes a page.

FIG. 5 is a block diagram of a micro program controller embodied by the first example of the Prior Art technology. This controller comprises an instruction fetch unit 50, a read/branch unit 51 for reading and branching micro instructions, and an execution unit 52 for executing computations such as additions and data shifts. The execution unit 52 includes ALUs, decoders and registers.

The an instruction fetch unit 50 comprises a start address register 510 for storing the start address of a micro program. The read/branch unit 51 is constituted of an end judgment circuit 531 for generating a termination signal of micro program by referring to the end judgment field 601 of the micro instruction, an address selector 520 for determining whether to start, continue, or terminate a micro program by referring to the termination signal of the micro program, an address register 511 for storing the page address of micro instruction, a control storage 530 for storing micro instructions, a branch judgment circuit 532 for determining whether to branch or not by referring to both the micro instruction read out during the immediately preceding cycle and the result of execution of the previous cycle, a bank selector 521 to which one instruction selected from two micro instructions read out in accordance with the branch judgment signal is output, and a data register 512 for storing the branch condition field 602 of micro instruction and the control field 603. The control storage 530 has two banks, namely bank 0 and bank 1, specified by the same address, and stores a micro instruction page. As have been described above one page is of the size of two micro instructions.

Next referring to the timing chart shown in FIG. 7 and to the flow chart shown in FIG. 8, the execution procedure of a micro program control embodied by the first example of Prior Art technology.

In cycle (C-1), a start address A10 of a micro program stored in the start address register 510 in the instruction fetch unit 50 is transferred to the read/branch unit 51. The start address A10 is input to the address selector 520 and stored in the address register 511 after the transfer.

In cycle (C0), the page address of the control storage 530 is specified by the start address A10 of the micro program stored in the address register 511, to read out a micro instruction M100 from the bank 0 and another micro instruction M101 from the bank 1. The bank selector 521 selects either of two micro instructions M100 and M101 read out from the banks to start a branch operation B10. In the flow chart (FIG. 8), the micro instruction M100 read out from the bank 0 is selected at the branch operation B10. The page address field A20 of the selected micro instruction M100 is input to the address selector 520 and stored in the address register 511, while the branch condition field (not shown) and control field i100 in the micro instruction M100 selected by the bank selector 521 are stored in the data register 512.

In cycle (C1), as similar to the preceding cycle (C0), the page address A20 of the control storage 530 is selected for reading out and branching the micro instructions M200 and M201. The control field i100 of the micro instruction M100 stored in the data register 512 is transferred to the execution unit 52 to start executing operations. In the procedure shown in this flow chart (FIG. 8), for the sake of facilitating the understanding of the illustrated procedure, the branching selects alternately bank 0 and bank 1. As the result of foregoing execution, the micro instruction controls the execution unit in the following order: i100 (cycle C1), i201 (cycle C2), i310 (cycle C3), i421 (cycle C4).

In a second example of the Prior Art technology a micro instruction having one field of branched target address following Nth cycle (where N≧2) and another field for controlling the execution following Nth cycle (where N≧2) controls the micro program. This technology has been devised for accelerating said first technology, as disclosed in the U.S. Pat. No. 4,494,195.

Now referring to FIGS. 9 through 12 an embodiment in accordance with the second Prior Art technology (in case of N=2) and the execution procedure thereof will be described below.

FIG. 10 shows an exemplary format of a micro instruction in accordance with the second Prior Art technology, with N=2, which contains a field of page address following the next cycle 1000, a field of end judgment following the next cycle 1001 for use in determining whether the micro program terminates by second cycles, a field of branch condition following the next cycle 1002 for use in the branch judgment by the cycle following the next, and a field of control following the next cycle 1003 for use in controlling the execution in the cycle following the next. In this second Prior Art technology a set of four micro instructions composes a page.

FIG. 9 shows a block diagram of a micro program controller embodied by the second Prior Art technology, with N=2. This controller unit, as similar to preceding first technology, comprises an instruction fetch unit 90, a read/branch unit 91, and an execution unit 92.

In second technology of the Prior Art, where N=2, in order to obtain the same micro program control as first technology, a start address should be fetched at the beginning of the micro program, in addition to two micro instructions to be executed in the cycle following the next (for bank 0 and bank 1, respectively). The instruction fetch unit 90 thus comprises a start address register of micro program 910, a second cycle micro instruction register (bank 0) 911 for use in storing second cycle micro instruction (bank 0), and another second cycle micro instruction register (bank 1) 912 for use in storing second cycle micro instruction (bank 1).

The read/branch unit 91 comprises a bank selector 920 for selecting either one of second cycle micro instruction register 911 (for bank 0) or second cycle micro instruction register 912 (for bank 1), an end judgment circuit 931, an address selector 921, an address register 913, a control storage 930 including 4 banks constituted of bank 00, bank 01, bank 10, and bank 11, a branch judgment circuit 932, a bank selector 922 for selecting either one of micro instruction read from bank 00 and bank 10 of the control storage 930, another bank selector 923 for selecting either one of micro instruction read from bank 01 and bank 11 of the control storage 930, another bank selector 920 for selecting one micro instruction from within micro instructions selected by the bank selector 922, bank selector 923 and bank selector 924, and a data register 914.

Next, the operation and execution procedure of the micro program controller embodied by the second technology will be described below with reference to the timing chart shown in FIG. 11 and the flow chart shown in FIG. 12. In the second Prior Art technology, since read/branch is executed for two cycles, a read/branch (for even cycle) for starting read out of the control storage 930 in an even cycle and another read/branch (for odd cycle) for starting read out of the control storage 930 in an odd cycle are executed in a pipeline manner.

Now the read/branch (for odd cycle) will be described in greater details. In cycle (C-1) the page address field A20 of micro program stored in the register of micro program start address resister 910 in the instruction fetch unit 90 is transferred to the read/branch unit 91. Thereafter, the page address A20 is input to the address selector 921 and then stored in the address register 913.

In cycle (C0), a page in the control storage 930 is specified by the page address A20 of the micro program stored in the address register 913 to read out four micro instructions M200 (from bank 00), M201 (from bank 01), M210 (from bank 10) and M211 (from bank 11), which will be executed in the cycle following the next (C2). Either the micro instruction M200 read out from the bank 00 or micro instruction M210 read out from the bank 10 is selected by the bank selector 922, while at the same time either the micro instruction M201 read out from the bank 01 or the micro instruction M211 read out from the bank 11 is also selected by the bank selector 923 in parallel, so as to perform a branch operation B10. In the flow chart (FIG. 12), a branch operation B10 selects a pair of micro instruction M200 read out from the bank 00 and micro instruction M201 read out from the bank 01. Depending on the design of apparatus, the branch operation B10 may be done in the next cycle (C1).

In cycle (C1), the bank selector 924 selects a micro instruction M201 from a pair of two micro instructions M200 and M201 selected in the branch operation B10 of the preceding cycle (C0) (branch operation B20). The field A41 of page address following the next cycle of the selected micro instruction M201 is input into the address selector 921 and then stored to the address register 913. The field of branch condition following the next cycle and the control field following the next cycle (i201) of the selected micro instruction (not shown) selected by the bank selector 924 are stored into the data register 914.

In cycle (C2), in addition to a read out of micro instructions as similar to cycle (C0), control field following the next cycle (i201) stored in the data register 914 is transferred to the execution unit 92 to start execution. In a similar manner, the read/branch (for even cycle) and execution will be performed. In the flow chart (FIG. 12), the micro instruction selected by the read/branch (for even cycle) controls the execution unit in the following order: i201 (cycle C2), i421 (cycle C4).

Now the read/branch operation (for odd cycle) will be described below in greater details. Two micro instructions M100 and M101 stored in the second cycle micro instruction register 911 (bank 0) and the second cycle micro instruction register 912 (bank 1) in the instruction fetch unit 90 are transferred to the read/branch unit 91 in cycle (C0). After that, one micro instruction M100 is selected by the bank selector 920 from these two micro instructions (branch operation B10) The address following the next cycle field A30 of the micro instruction M100 selected by the bank selector 920 is input to the address selector 921 and stored in the address register 913. At the same time, the branch condition field (not shown) and the control field (i100) of the micro instruction M100 selected by the bank selector 920 will be input to the bank selector 924 and stored in the data register 914.

In cycle (C1), a read/branch operation is performed as similar to the cycle (C0) of read/branch operation (for even cycle), as well as the control field i100 stored in the data register 914 is transferred to the execution unit 92 to start execution. In a similar manner, the read/branch operation (for odd cycle) and execution will be performed. In the flow chart (FIG. 12), the micro instruction selected by the read/branch (for odd cycle) controls the execution unit in the following order: i100 (cycle C1), i310 (cycle C3).

As a result, when the read/branch operation (for even cycle) and read/branch operation (for odd cycle) performed in a pipeline basis are combined, the micro instruction controls the execution unit 92 in the following order: i100 (cycle C1), i201 (cycle C2), i310 (cycle C3), i421 (cycle C4). One may be appreciated that the execution procedure is the same as the first Prior Art technology.

In recent years, the access time of memory and the line delay in the signal transfer are the major factors limiting the operation frequency of a microprocessor.

In the micro program control in accordance with the first Prior Art technology a micro instruction possesses the field of branch target address for the next cycle. This may cause a disadvantage that the processing frequency may not be so increased, because the establishment of address of a micro instruction, comprised of a plurality of operations such as a read out of the micro instruction from the control storage, a selection of micro instruction depending on a branch condition, long distance transfer of the branch target address, should be done within a cycle.

In the micro program control in accordance with the second Prior Art technology the micro instruction possesses the branch target address of Nth cycle (N≧2) after the read out cycle of the micro instruction and the field for controlling execution in Nth cycle (N≧2). In this method the disadvantage in relation to the executable frequency is remedied by splitting the decision of address of micro instruction as performed in the first Prior Art technology into Nth cycles (N≧2).

The second Prior Art technology may suffer from the disadvantage that the amount of memory required for storage of micro program will be increased to (N−1) th power folds of 2, because the number of micro instructions to be read out at once from the control storage is Nth power of 2.

SUMMARY OF THE INVENTION

Accordingly, the object of the present invention is to provide a micro program control method and apparatus thereof, which may overcome the problem of working frequency in the first Prior Art technology and the problem of amount of memory for storing micro programs in the second Prior Art technology.

In order to achieve the above described object, the present invention makes use of a high speed micro program control method for specifying the branch target address following Nth cycle (N≧2), as disclosed in the second Prior Art technology (reference should be made to the U.S. Pat. No. 4,494,195), for reading out two micro instructions at once having micro instruction format with the (N−1) th power of 2 of fields of the branch target address in following Nth cycle, and a field for controlling the next cycle execution.

More specifically, the present invention comprises following means (1) through (3):

(1) a field for specifying a branch target address at Nth (N≧2) cycle after the read out cycle of the micro instruction or a field for determining the end of micro program at Nth (N≧2) cycle, and a micro instruction comprised of a field for controlling the next cycle execution are used for performing in parallel the control of determination of addresses in succeeding Nth cycle and the execution control in the next cycle.

(2) for data processing under the micro instruction control that reads out M micro instructions (M≧2) from one single address to perform the execution of one instruction selected therefrom, a micro instruction comprising (N−1) th power of M of fields for specifying the branch target address in following Nth (N≧2) cycle after the read out cycle of micro instruction, (N−1) th power of M of fields for determining the termination of micro program in Nth (N≧2) cycle, a field for controlling the execution of the next cycle, is used so as to perform controls substantially identical to the means (1) above, even in case in which there are M branch targets.

(3) for data processing under the micro instruction control that reads out M micro instructions (M≧2) from one single address to perform the execution of one instruction selected therefrom, if a micro program is split into a plurality of blocks, a micro instruction comprising (N−1) th power of M of fields for specifying the branch target address offset within the block in the following Nth (N≧2) cycle after the read out cycle of micro instruction, (N−1) th power of M of fields for determining the termination of micro program at the following Nth (N≧2) cycle, a field for specifying the branch target block address following Nth cycle (N≧2), and a field for controlling the execution of the next cycle, is used to perform control such that the field length (number of bits) for specifying the branch target address can be less than the methods (1) and (2) above.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

In drawings.

DETAILED DESCRIPTION OF THE INVENTION

A detailed description of some preferred embodiments embodying the present invention will now be given referring to the accompanying drawings.

A first embodiment of micro program control (N=2) in accordance with the present invention will be described with reference to the accompanying FIG. 1 to FIG. 4, and a second embodiment of the present invention will then be described with reference to the accompanying FIG. 13 to FIG. 16.

In the present invention, every instruction may be brancheable. If the starting address and the second cycle address are initially given then the instruction addresses thereafter may be given by the branch address field in the instruction.

Figure 2:
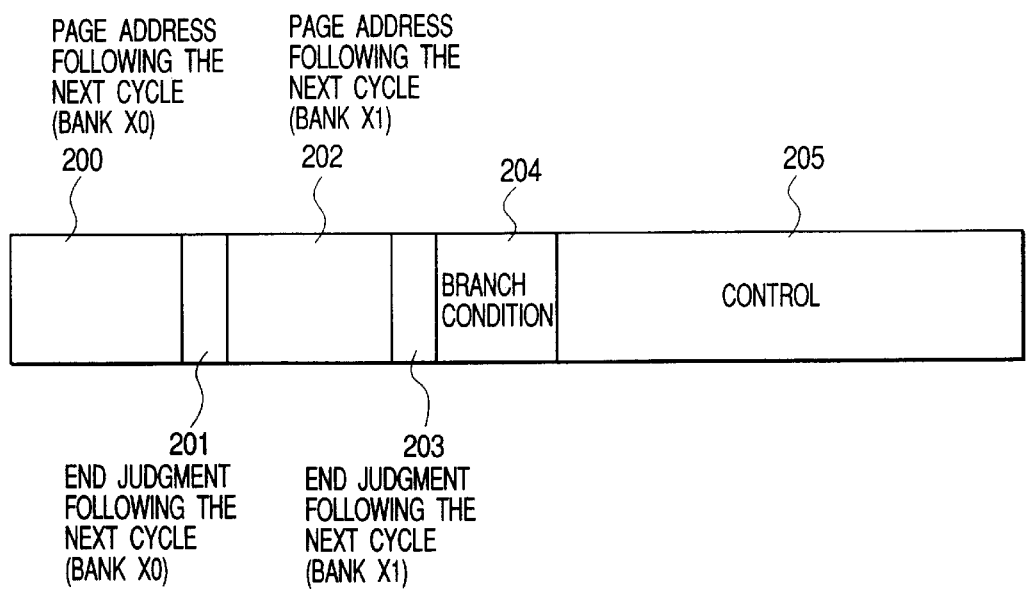
FIG. 2 shows a block diagram of a format of micro instruction for use in first embodiment in accordance with present invention.

FIG. 2 shows a format of micro instruction for use in first embodiment in accordance with present invention, which comprises field of page address following the next cycle 200 (for bank X0) and 202 (for bank X1), which are page addresses of branch targets of the cycle following the next, field of end judgment following the next cycle 201 (for bank X0) and 203 (for bank X1), which are used for determining the termination of micro program in the cycle following the next cycle, a branch condition field 204 for determining whether to branch in the next cycle, and a control field 205 for performing the control of micro instruction in the next cycle. In first embodiment in accordance with the present invention (N=2), a pair of micro instructions composes a page, i.e., one page contains sufficient memory area for storing two micro instructions.

Figure 1:
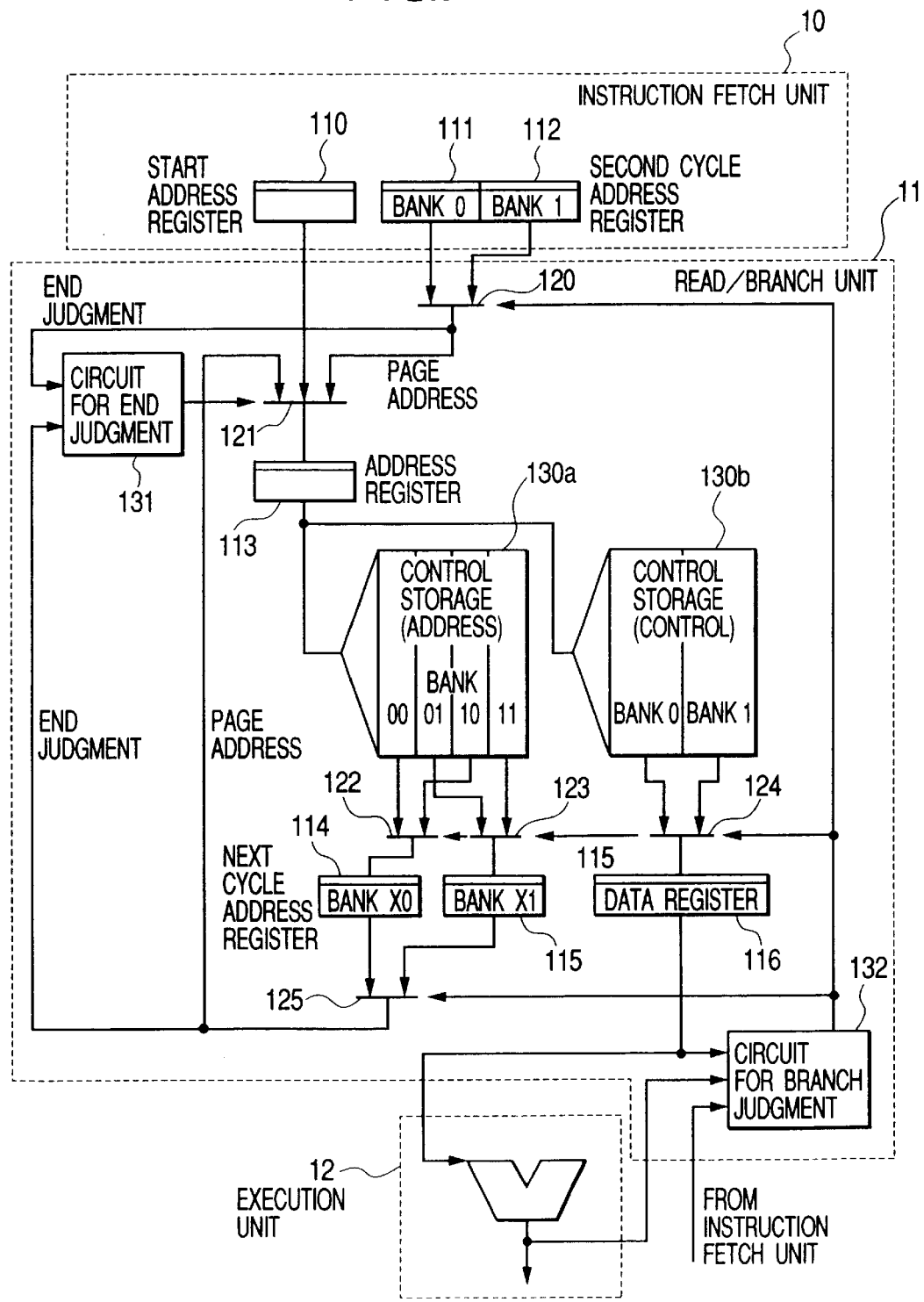
FIG. 1 shows a block diagram of a micro program controller of first embodiment in accordance with the present invention.

FIG. 1 shows a block diagram of a micro program controller of first embodiment in accordance with the present invention. This controller apparatus comprises, as similar to the first and second Prior Art technologies, an instruction fetch unit 10 for fetching start addresses of micro programs, a read/branch unit 11 for reading out and branching micro instructions, and an execution unit 12 for executing addition and data shift (which unit contains ALUs, decoders, registers).

The instruction fetch unit 10 comprises a start address register 110 for storing start addresses of micro programs, a second cycle address register (for bank 0) 111 for storing the page address in the second cycle (bank 0) and the end judgment signal (bank 0) of a micro program in the second cycle, a second cycle address register (bank 1) 112 for storing the page address in the second cycle (bank 1) and the end judgment signal (bank 1) of a micro program in the second cycle.

The read/branch unit 11 comprises a bank selector 120 for selecting either one of the second cycle address register (for bank 0) 111 or the second address register (for bank 1) 112, an end judgment circuit 131 for generating an end judgment signal by referring to the end judgment field of micro program of the previous cycle, an address selector 121 for selecting starting, continuing, or terminating the micro program depending on the end judgment signal of micro program, an address register 113 for storing a page address of micro program, a control storage (address) 130a comprised of four banks (bank 00, bank 01, bank 10, and bank 11) storing field of page address following the next cycle and field of end judgment following the next cycle of a micro instruction, a control storage (control) 130b comprised of two banks (bank 0 and bank 1) storing a branch condition field and a control field of a micro instruction, a branch judgment circuit 132 for generating branch judgment signal by referring to the branch condition field 204 of the micro instruction read at the previous cycle and the execution result of the previous cycle, a bank selector 122 for selecting either one of bank 00 or bank 10 of the control storage (address) 130a, a bank selector 123 for selecting either one of bank 01 or bank 11 of the control storage (address) 130a, a next cycle address register (bank X0) 114 for storing the contents of bank selected by the bank selector 122, another next cycle address register (bank X1) 115 for storing the contents of bank selected by the bank selector 123, a bank selector 124 for selecting either one of bank 0 or bank 1 of the control storage (control) 130b, a data register 116 for storing the contents of bank selected by the bank selector 124, and a bank selector 125 for selecting either one of next cycle address register (bank X0) 114 or next cycle address register (bank X1) 115.

When making correspondence banks of the control storage with the format of a micro instruction 20, the bank 00 and bank 01 of the control storage (address) 130a, and the bank 0 of the control storage (control) 130b form one micro instruction. In the bank 00 of the control storage (address) 130a the field of page address following the next cycle (bank X0) 200 and the field of end judgment following the next cycle (bank X0) 201 of micro instruction are stored. In the bank 01 of the control storage (address) 130a the field of page address following the next cycle (bank X1) 202 and the field of end judgment following the next cycle (bank X1) 203 are stored. In the bank 0 of the control storage (control) 130b the branch condition field 204 and the control field 205 are stored.

Similarly, the bank 10 and bank 11 of the control storage (address) 130a, and the bank 1 of the control storage (control) 130b form another micro instruction. In the bank 10 of the control storage (address) 130a the field of page address following the next cycle (bank X0) 200 and the field of end judgment following the next cycle (bank X0) 201 are stored. In the bank 11 of the control storage (address) 130a the field of page address following the next cycle (bank X1) 202 and the field of end judgment following the next cycle (bank X1) 203 are stored. In the bank 1 of the control storage (control) 130b the branch condition field 204 and the control field 205 are stored.

Figure 3:
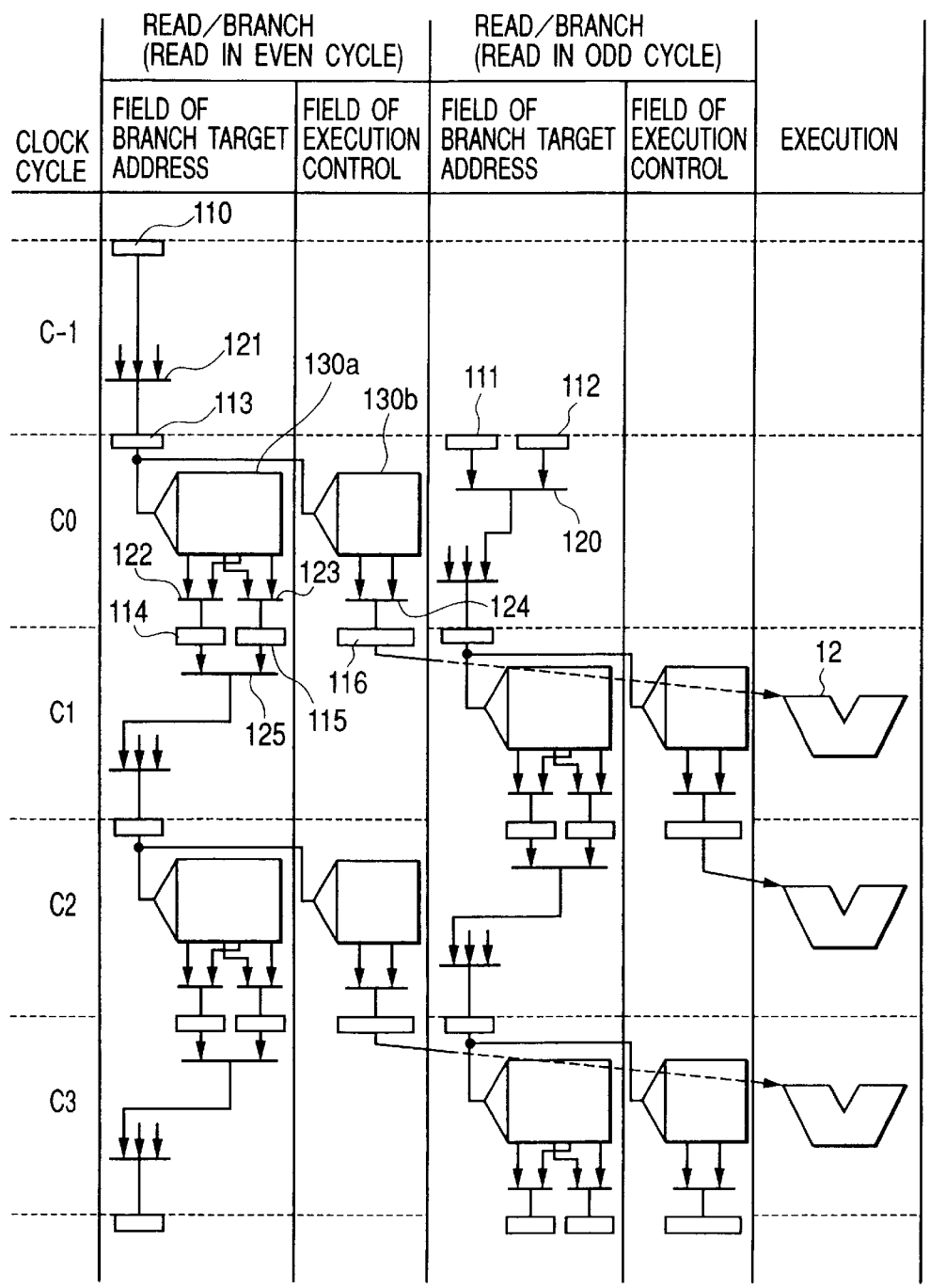
FIG. 3 shows a timing chart at the time of execution of a micro instruction used in first embodiment in accordance with the present invention.

The operation and the execution procedure of the micro program controller apparatus embodied by first embodiment in accordance with the present invention will be described below, with reference to the timing chart of FIG. 3 and flow chart of FIG. 4.

Figure 4:
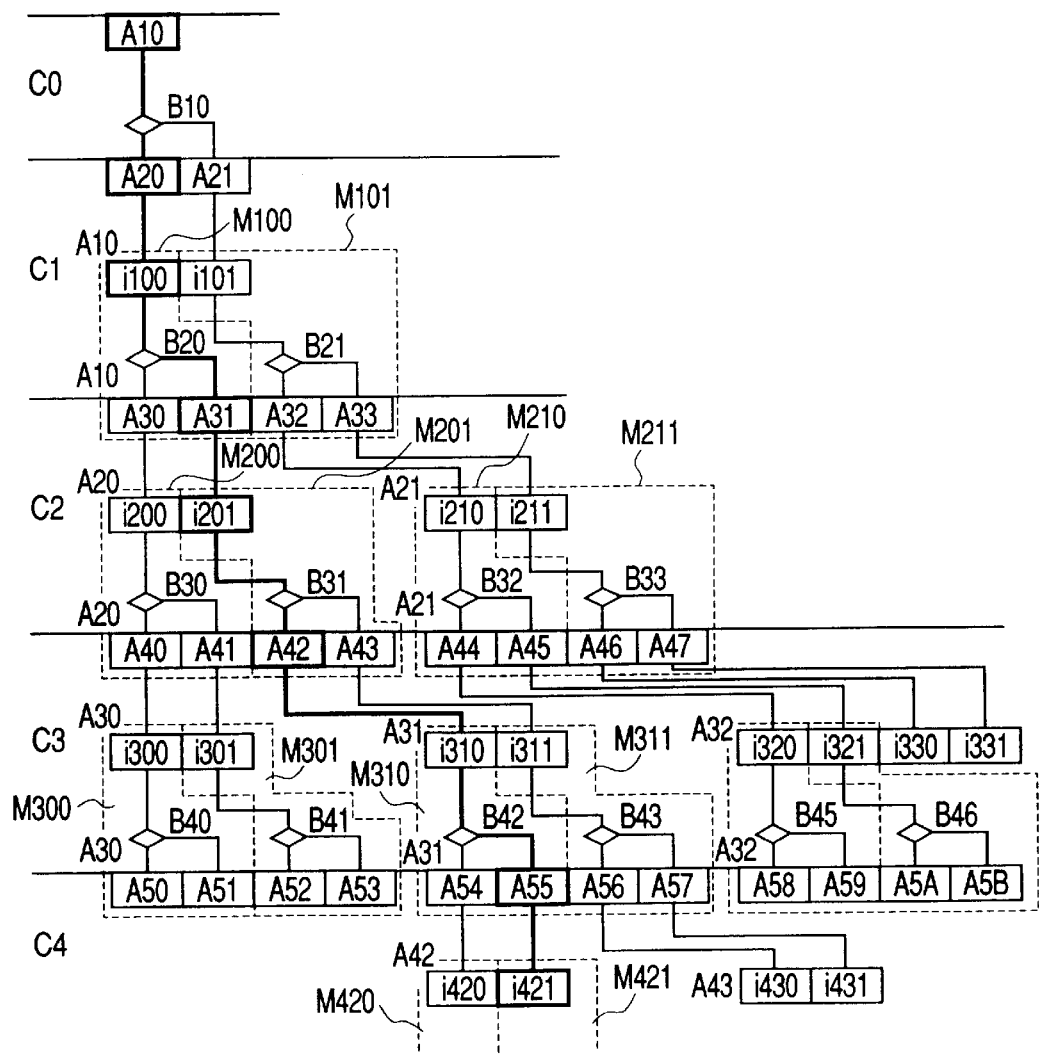
FIG. 4 shows a flow chart of the procedure of executing a micro instruction in first embodiment in accordance with the present invention.
Figure 5:
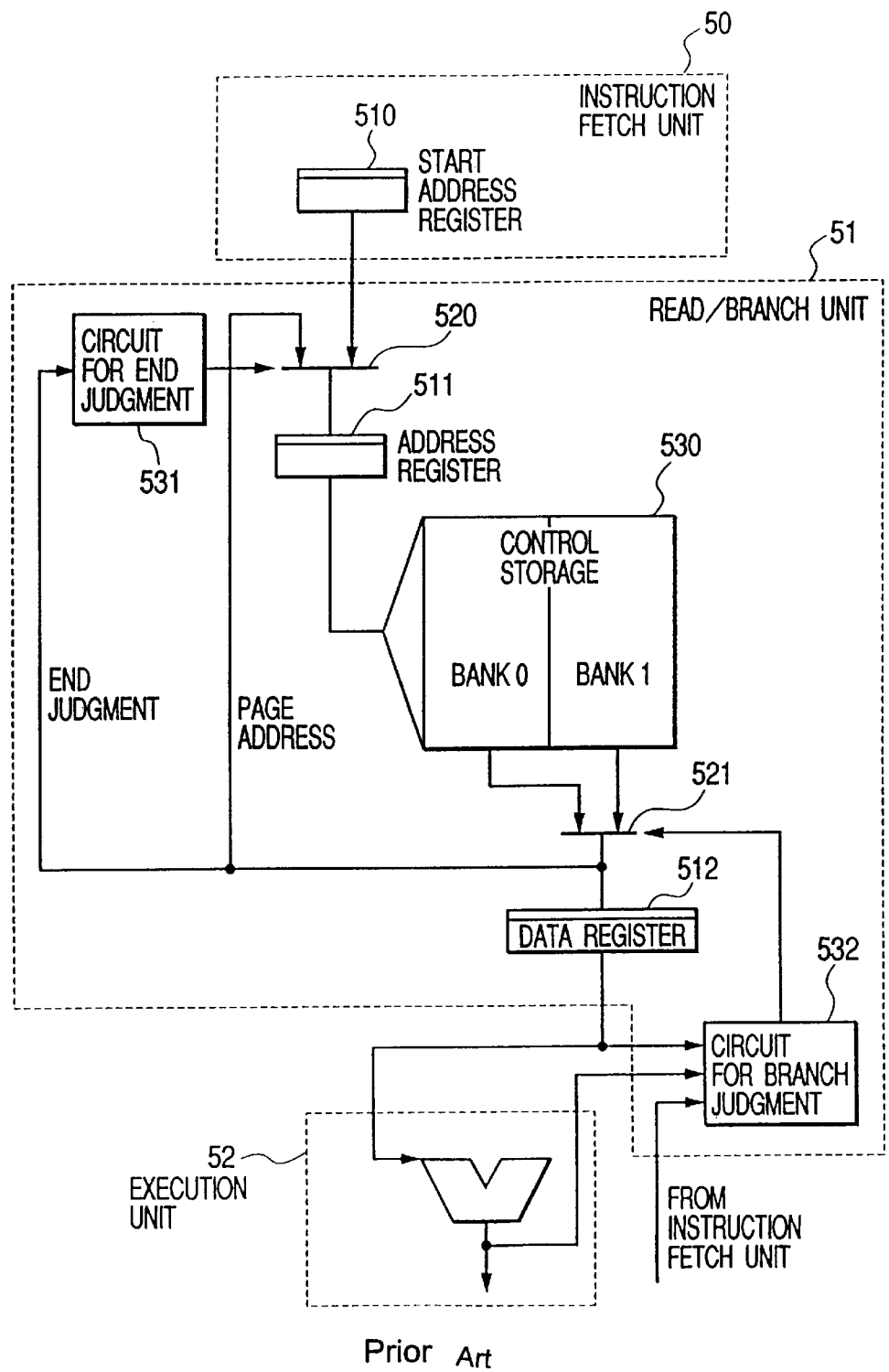
FIG. 5 shows a block diagram of micro program controller in accordance with first Prior Art technology.
Figure 6:
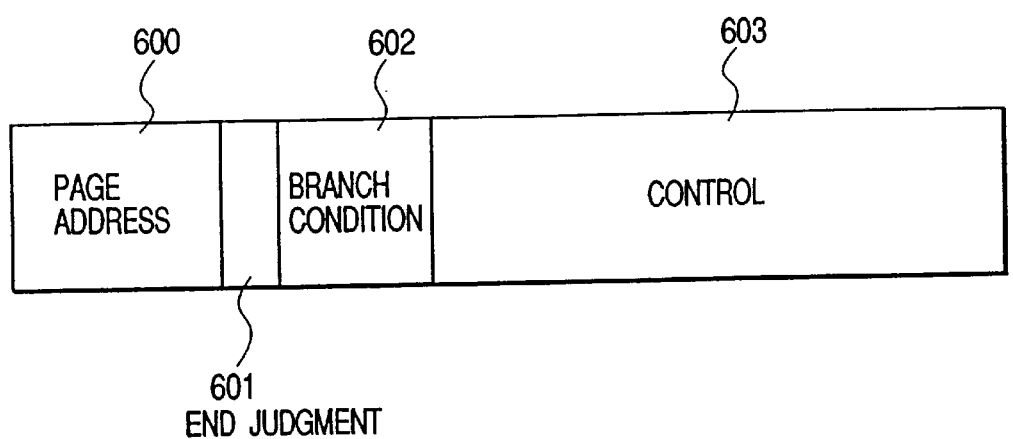
FIG. 6 shows a format of micro program for use in the first Prior Art technology.
Figure 7:
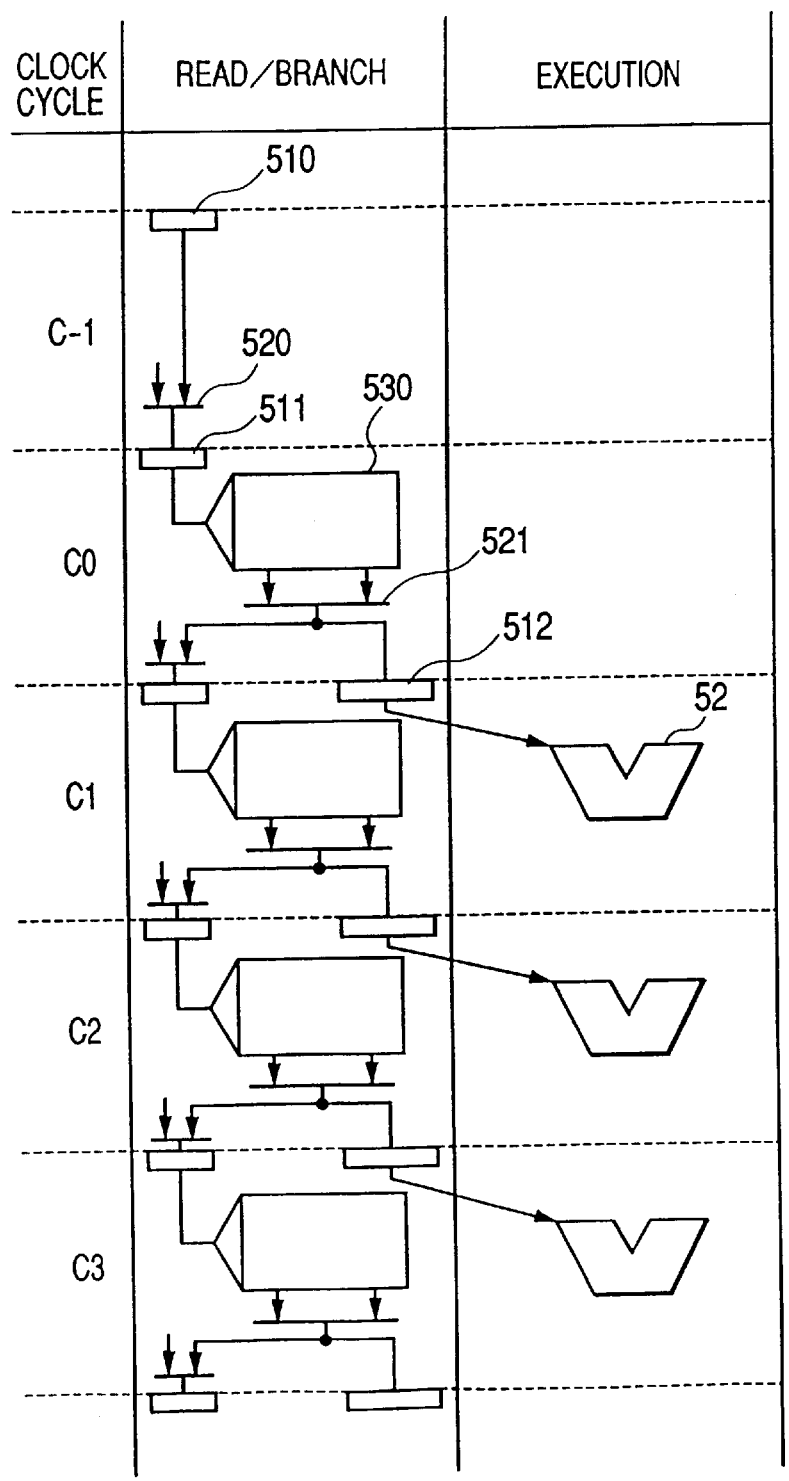
FIG. 7 shows a timing chart at the time of execution of a micro instruction used in the first Prior Art technology.
Figure 8:
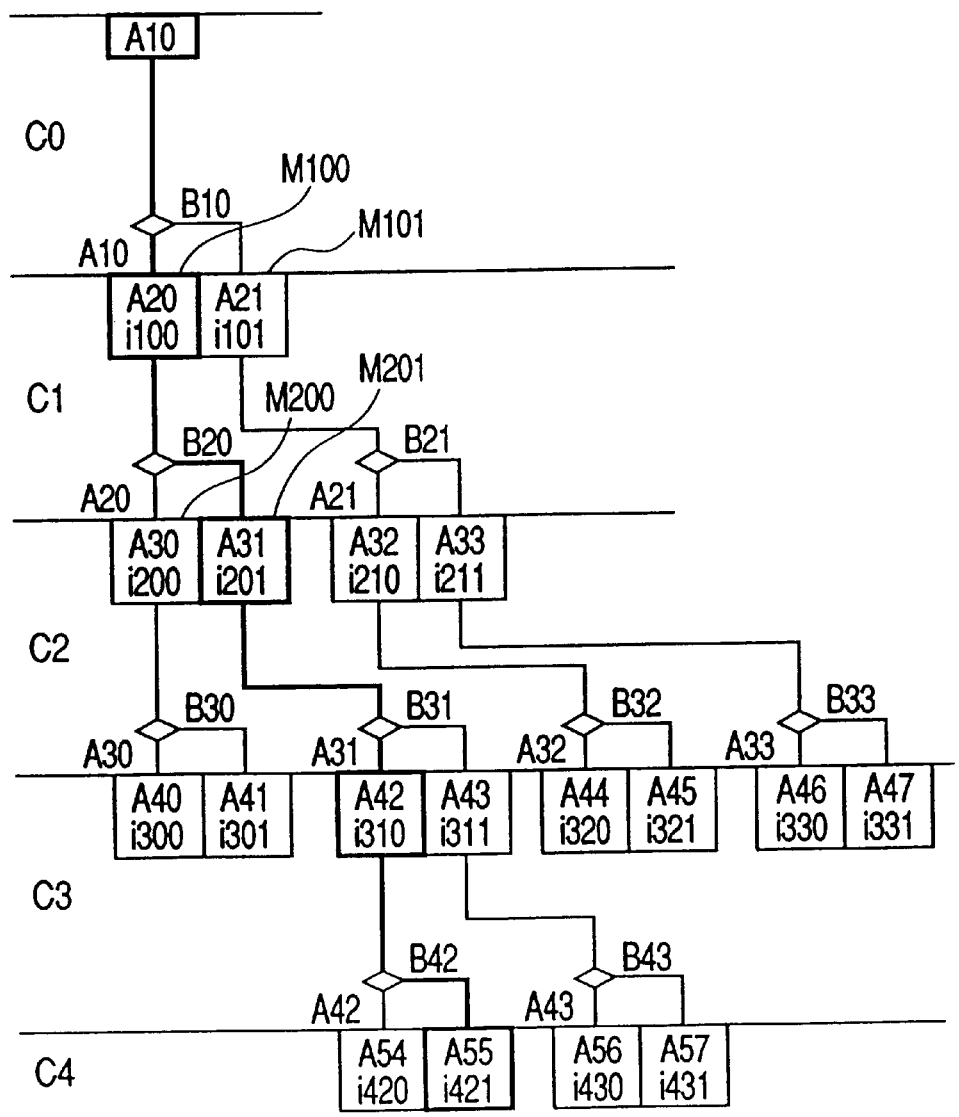
FIG. 8 shows a flow chart of the procedure of executing a micro instruction in the first Prior Art technology.
Figure 9:
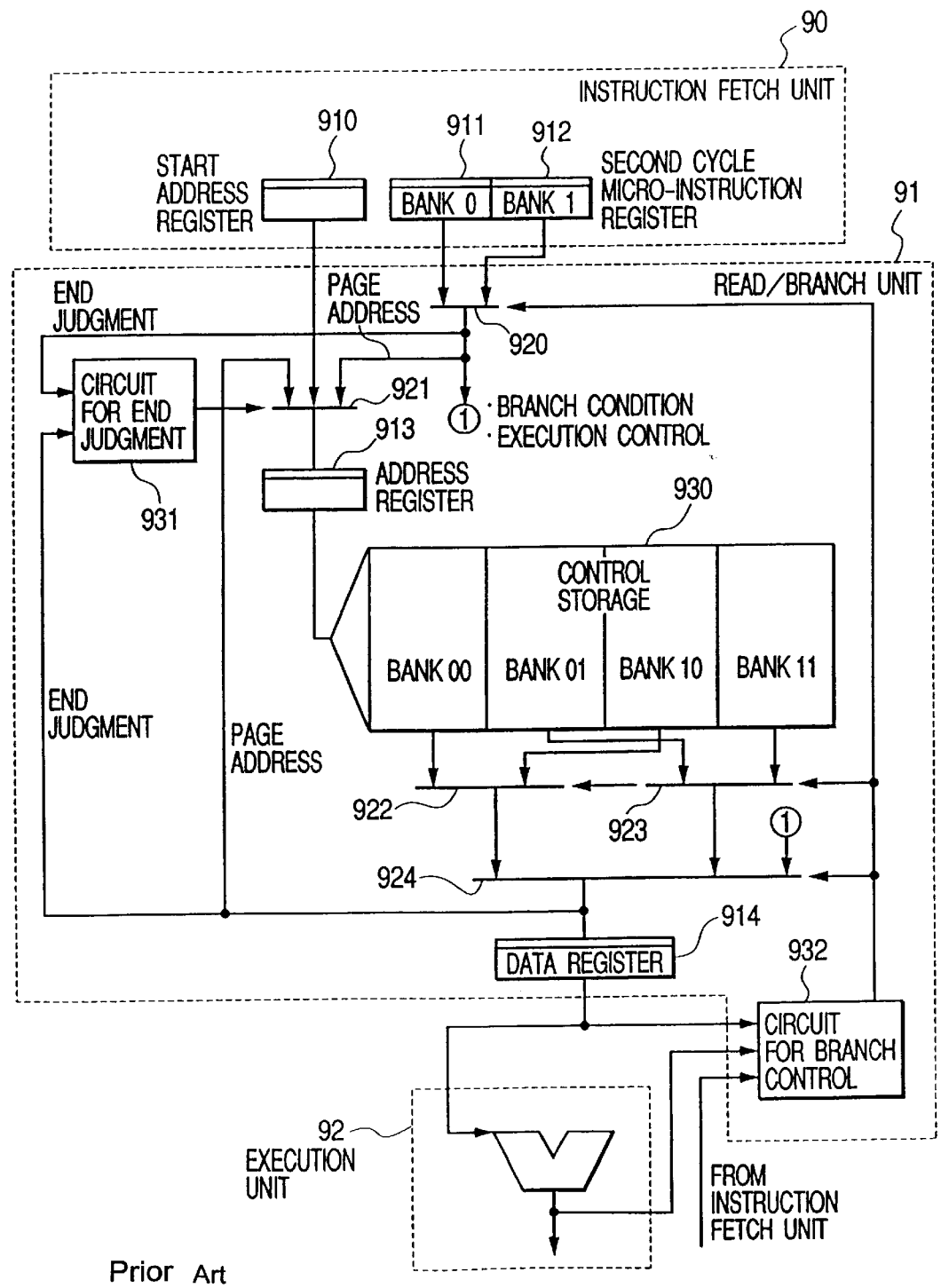
FIG. 9 is a block diagram of micro program controller in accordance with second Prior Art technology.
Figure 10:
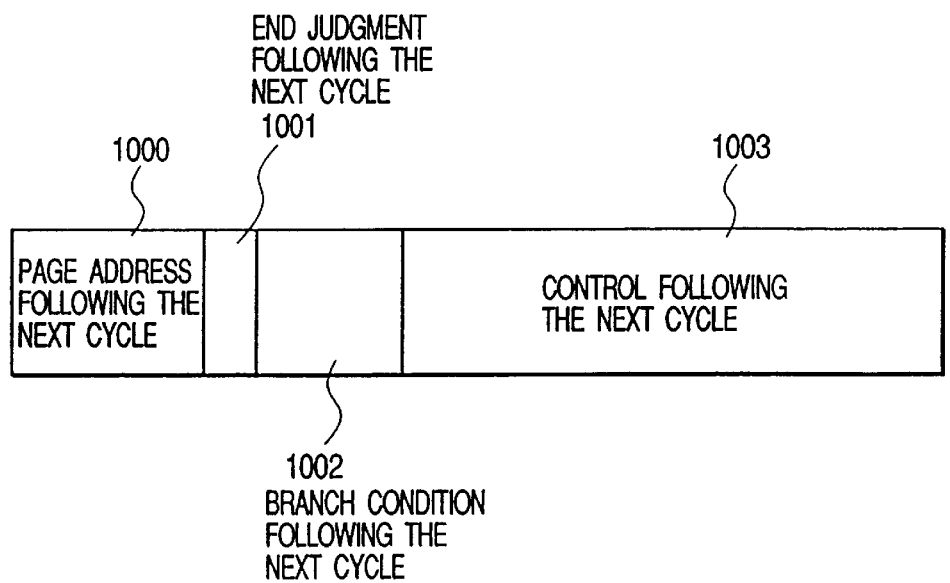
FIG. 10 shows a format of micro program for use in the second Prior Art technology.
Figure 11:
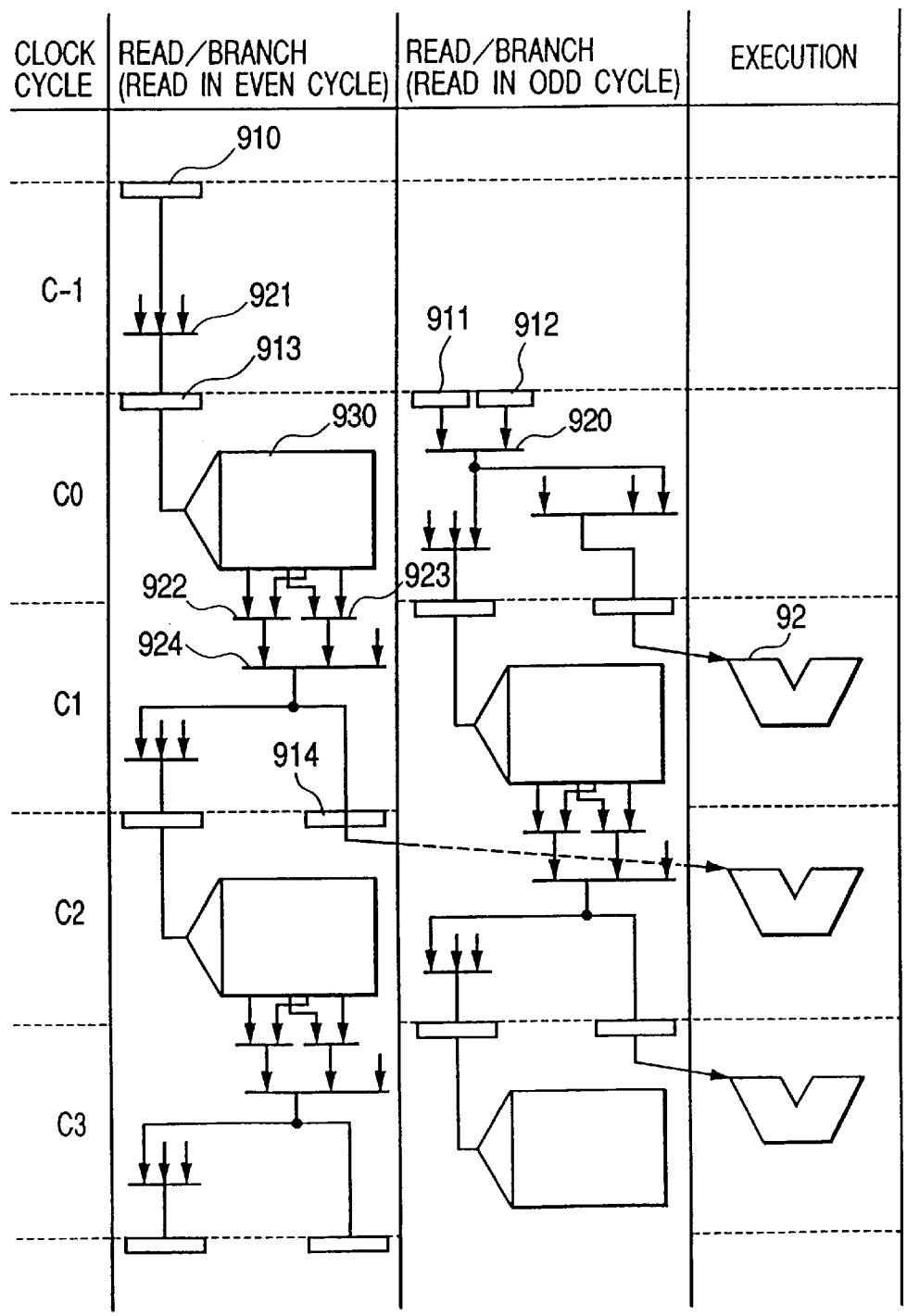
FIG. 11 shows a timing chart at the time of execution of a micro instruction used in the second Prior Art technology.
Figure 12:
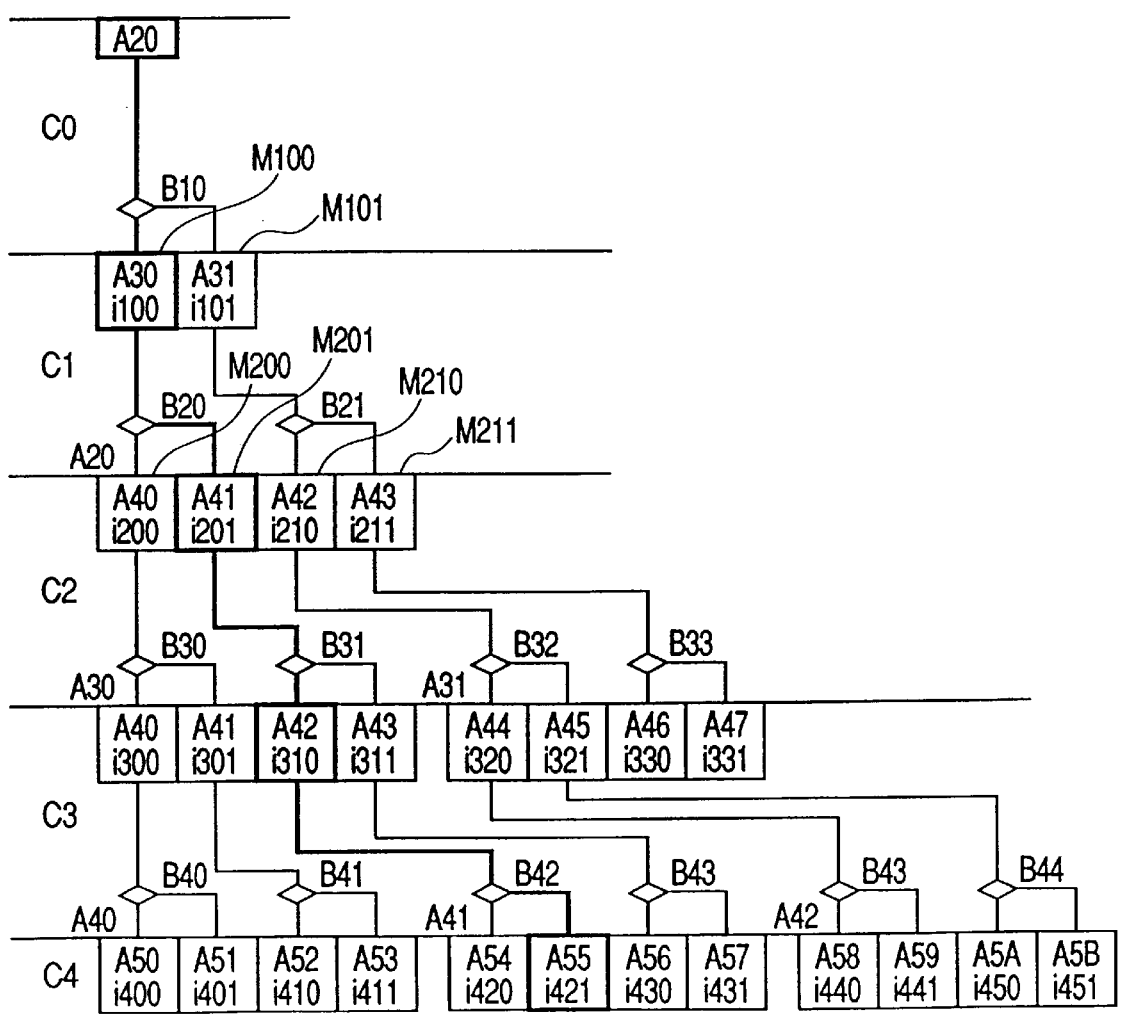
FIG. 12 shows a flow chart of the procedure of executing a micro instruction in the second Prior Art technology.

FIG. 4 shows a flow chart of the procedure of executing a micro instruction in first embodiment in accordance with the present invention. In the figure Axx indicates an address of instruction, where a start address A10 is given at (C0), addresses from A30 to A33 are read out. In (C1) second cycle address A20 and A21 are given. In (C2) one address of A30 through A33 is selected in accordance with the result from the branch judgment circuit 132. When A20 is selected in (C1) addresses A40 through A43 are read out. In (C3) one address of A40 through A43 is selected. If A21 is selected in (C1), then A44 to A47 will be read out in (C1). As can be seen, four addresses are always read out in accordance with the result of address selection.

The meaning of FIG. 4 will be described in another way each of M100, M101, M200, M201, M210, M211, M310, M311, M420, and M421, surrounded by dotted rectangle, is an information item read out by one instruction, respectively. For example, M100 contains i100, A30, and A31; M101 contains i101, A32, and A33. reference numerals A10, A20, A21, A31, and A32 noted at the left hand side of the area surrounded by a dotted line indicates the address of stored information in respective area surrounded by the dotted line. A pair of micro instructions are read out simultaneously, e.g., an instruction M100 is read out together with M101, and M200 together with M201. M100 and M101 are read out when the address A10 is determined, control i100 is executed in the next cycle (C1), and the address A31 is determined the second next cycle (C2). In a similar manner, M200 address M201 are read out when the address of A20 is selected and determined. The control i201 is executed in the next cycle (C2), the address A42 will be determined in the second next cycle. As have been described above, if A21 is selected in the cycle (C1) instead of A20 then the information in the areas M210 and M211 surrounded by the dotted line along with the reference numeral A21 at the left hand side will be read out.

In the present invention, read/branch operation of the address field in a micro instruction is executed by 2 cycles, so that a read/branch operation (for even cycle) for starting reading out of control storage (address) 130a in an even cycle and a read/branch operation (for odd cycle) for starting reading out of control storage (address) 130a in an odd cycle are executed in a pipeline manner.

Now the read/branch operation (for even cycle) will be described below. In cycle (C-1), the start address A10 of the micro program stored in the start address register 110 in the instruction fetch unit 10 is transferred to the read/branch unit 11. After that, start address A10 is input to the address selector 121 and then stored in the address register 113.

In cycle (C0), a page in the control storage (address) 130*a* and control storage (control) 130*b* is specified by the start address A10 of the micro program stored in the address register 113 to read out two micro instructions M100 and M101. The bank selector 122 selects either the address following the next cycle A30 (bank 00) or A32 (bank 10), both read out from the control storage (address) 130*a*, depending on the branch judgment signal from the branch judgment circuit 132, then bank selector 123 selects either the address following the next cycle A31 (bank 01) or A33 (bank 11), both read out from the control storage (address) 130*a*, and the bank selector 124 selects either the control field i100 (bank 0) or i101 (bank 1) read out from the control storage (control) 130*b* to perform the branch operation B10. In the flow chart shown, The branch operation B10 selects the micro instruction M100 comprised of the control field i100, address following the next cycle A30 and A31. After the branch operation B10, the address following the next cycle A30 (bank 00) is stored into the next cycle address register (bank X0) 114, the address following the next cycle A31 (bank 0) into the next cycle address register (bank X1) 115, and the control field i100 into the data register 116. Depending on the design of the apparatus, the branch operation B10 may be done in the next cycle (C1).

In cycle (C1), from within the addresses following the next cycle A30 and A31, the address following the next cycle A31 is selected by the bank selector 125 to perform branch operation B20. Thereafter the address following the next cycle A31 selected by B20 is input into the address selector 121 and stored in the address register 113. In parallel to the branch operation B20, control field i100 stored in the data register 116 is transferred to the execution unit 12 to start execution. In a similar manner, read/branch operation (for even cycle) and execution will be performed. In the flow chart (shown in FIG. 4), the micro instruction selected by the read/branch operation (for even cycle) controls the execution unit in the order of i100 (cycle C1), and then i310 (cycle C3).

Now the read/branch operation (for odd cycle) will be described below. In cycle (C0) two page addresses A20 and A21 stored in the second cycle address register (for bank 0) 111 and 112 (for bank 1) in the instruction fetch unit 10 are transferred to the read/branch unit 11. After the transfer, from within two page addresses A20 and A21 a page address A20 is selected by the bank selector 120 (branch operation B10). Then, the page address A20 is input into the address selector 121 and stored in the address register 113. After that, read/branch operation will be executed in a manner similar to the read/branch operation (for even cycle). In the flow chart (shown in FIG. 4), the micro instruction selected by the read/branch operation (for odd cycle) controls the execution unit in the order of i201 (cycle C2), and then i421 (cycle C4) As a result, the read/branch operation (for even cycle) and read/branch operation (for odd cycle) performed in a pipeline basis, together controls the execution unit in the order i100 (cycle C1), i201 (cycle c2), i310 (cycle C3) and then i421 (cycle C4), indicating that first embodiment of the present invention performs the same execution procedure as first and second Prior Art technologies described above.

As have been described above, in first embodiment an address is determined for two cycles, the control storage storing the address is split into four banks so as to store the control information in the control storage having two banks. Then the reading out of the address is performed by reading out of four addresses in the cycle following the next cycle. Thus there are only four banks in the control storage required for the address to be stored, and only two banks may be needed in the control storage for storing control information, thereby the requirement of amount of memory may be reduced when compared to second Prior Art technology. Also, since an address is determined in two cycles, the length of a cycle may be shorten so as to enable faster operation than the first Prior Art technology.

Now the second embodiment of micro program control (N=2) in accordance with the present invention will be below described in greater details, with reference to FIG. 13 through FIG. 16. The second embodiment of the present invention differs from first embodiment of the present invention in that it embodies a micro program control by splitting the control storage into a plurality of blocks. The reason of splitting the control storage into blocks is to reduce the amount of memory required. A control storage providing block addresses of two banks, and block relative address of four banks may reduce the total amount of memory required.

Figure 14:
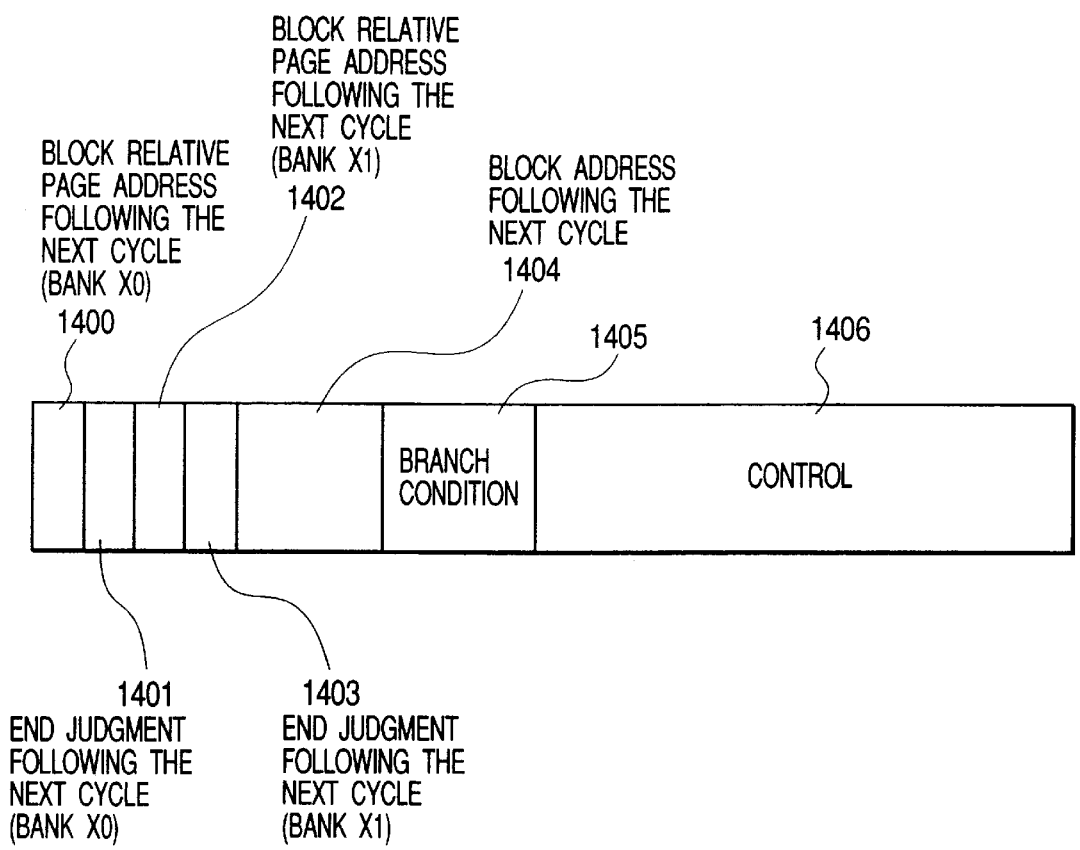
FIG. 14 shows a format of micro instruction for use in second embodiment in accordance with the present invention.

FIG. 14 shows a format of micro instruction for use in second embodiment in accordance with the present invention, which comprises a field of block relative page address following the next cycle (bank X0) 1400, and field of block relative page address following the next cycle (bank X1) 1402, which are page addresses within block in the in-block branch target following the next cycle, a field of end judgment following the next cycle (bank X0) 1401 and field of end judgment following the next cycle (bank X1) 1403, a field of block address following the next cycle 1404 for specifying the block address following the next cycle, a branch condition field 1405, and a control field 1406. In second embodiment in accordance with the present invention, a page is comprised of a pair of micro instructions as similar to first embodiment of the present invention.

Figure 13:
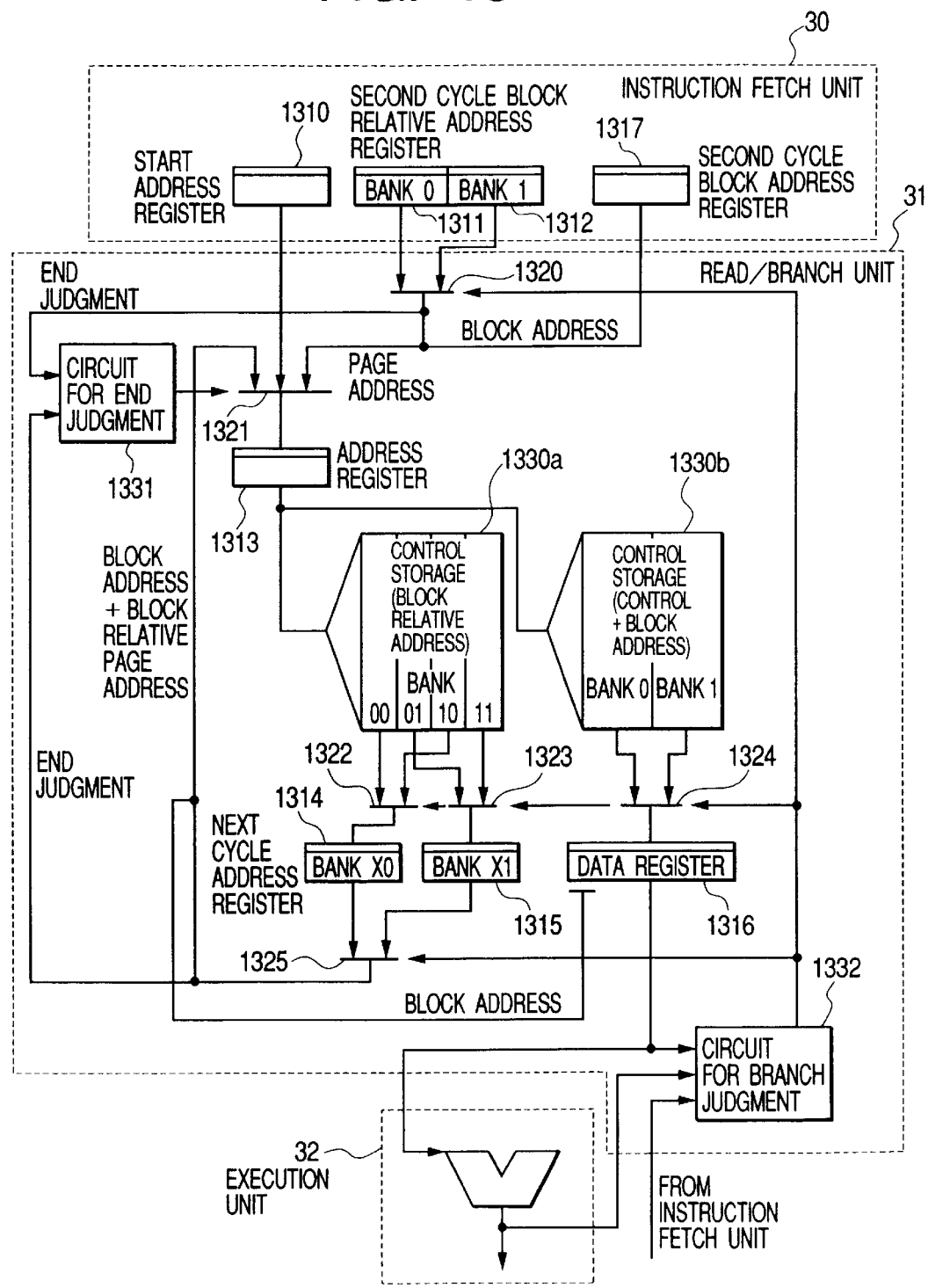
FIG. 13 shows a block diagram of a micro program controller of second embodiment in accordance with the present invention.

FIG. 13 shows a block diagram of a micro program controller of second embodiment in accordance with the present invention. This apparatus is, as similar to first Prior Art technology, second Prior Art technology, and first embodiment of the present invention, comprised of a instruction fetch unit 30, a read/branch unit 31 of micro instructions, and execution unit 32 (including ALUs, decoders, and registers).

The instruction fetch unit 30 comprises a start address register 1310, a second cycle block relative address register (bank 0) 1311 storing the block relative second cycle page address in the second cycle (bank 0) and end judgment signal (bank 0) of micro program in the second cycle, a second cycle block relative address register (bank 1) 1312 storing the block relative page address in the second cycle (bank 1) and end judgment signal (bank 1) of micro program in the second cycle, and a second cycle block address register 1317 storing second cycle block address.

The read/branch unit 31 comprises a bank selector 1320 for selecting either the second cycle block relative address register (bank 0) 1311 or the second cycle block relative address register (bank 1) 1312, an end judgment circuit 1331, an address selector 1321, an address register 1313, a control storage (block relative address) 1330*a* comprised of four banks (bank 00, bank 01, bank 10, bank 11) for storing the field of block relative page address following the next cycle and a field of end judgment following the next cycle, a control storage (control+block address) 1330*b* comprised of two banks (bank 0, bank 1) for storing a field of block address following the next cycle 1404, a branch condition field 1405, and a control field 1406, a branch judgment circuit 1332, a bank selector 1322 and bank selector 1323 for selecting banks in the control storage (address) 1330a, a next cycle address register (bank X0) 1314 and next cycle address register (bank X1) 1315 storing the contents selected by the bank selector 1322 and bank selector 1323, a bank selector 1324 for a control storage (control+block address) 1330b, a data register 1316, a bank selector 1325 for selecting either the next cycle address register (bank X0) 1314 or next cycle address register (bank X1) 1315.

For making correspondence of banks in the control storage with the micro instruction format, the bank 00 and bank 01 of the control storage (block relative address) 1330a and the bank 0 of the a control storage (control+block address) 1330b constitutes one single micro instruction. The bank 00 of control storage (block relative address) 1330a stores the field of block relative page address following the next cycle (bank X0) 1400 and the field of end judgment following the next cycle (bank X0) 1401. The bank 01 of the control storage (block relative address) 1330a stores the field of block relative page address following the next cycle (bank X1) 1402 and the field of end judgment following the next cycle (bank X1) 1403 of the micro instruction; the bank 0 of the a control storage (control+block address) 1330b stores the field of block address following the next cycle 1404, branch condition field 1405, and control field 1406.

Similarly, the bank 10 and bank 11 of the control storage (block relative address) 1330a, and the bank 1 of the a control storage (control+block address) 1330b constitutes another one single micro instruction. The bank 10 of the control storage (block relative address) 1330a stores the field of block relative page address following the next cycle (bank X0) 1400 and the field of end judgment following the next cycle (bank X0) 1401; the bank 11 of the control storage (block relative address) 1330a stores the field of block relative page address following the next cycle (bank X1) 1402 and the field of end judgment following the next cycle (bank X1) 1403; and the bank 1 of the a control storage (control+block address) 1330b stores the field of block address following the next cycle 1404, micro instruction branch condition field 1405, and control field 1406.

Figure 15:
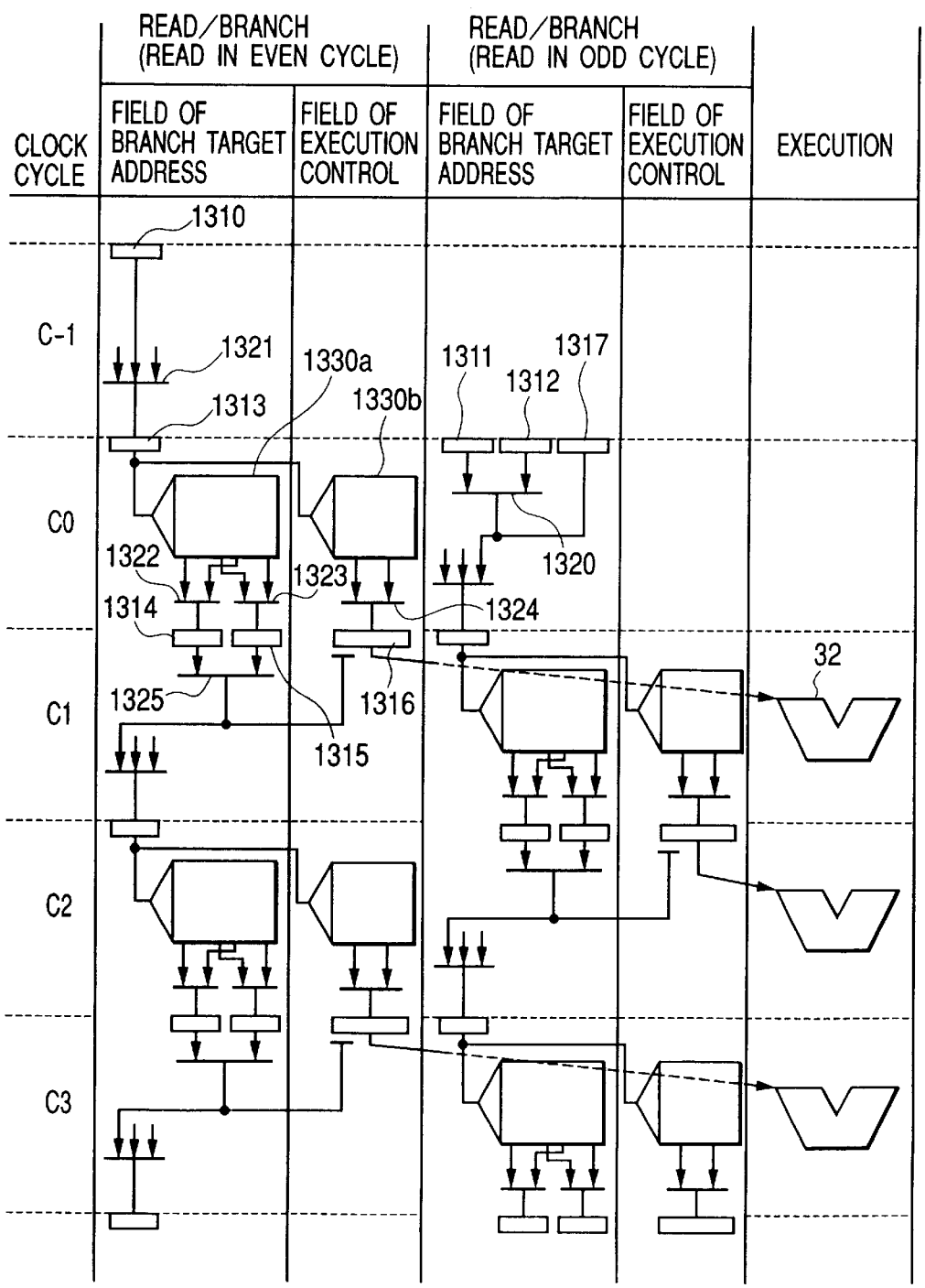
FIG. 15 shows a timing chart at the time of execution of a micro instruction in second embodiment in accordance with the present invention.
Figure 16:
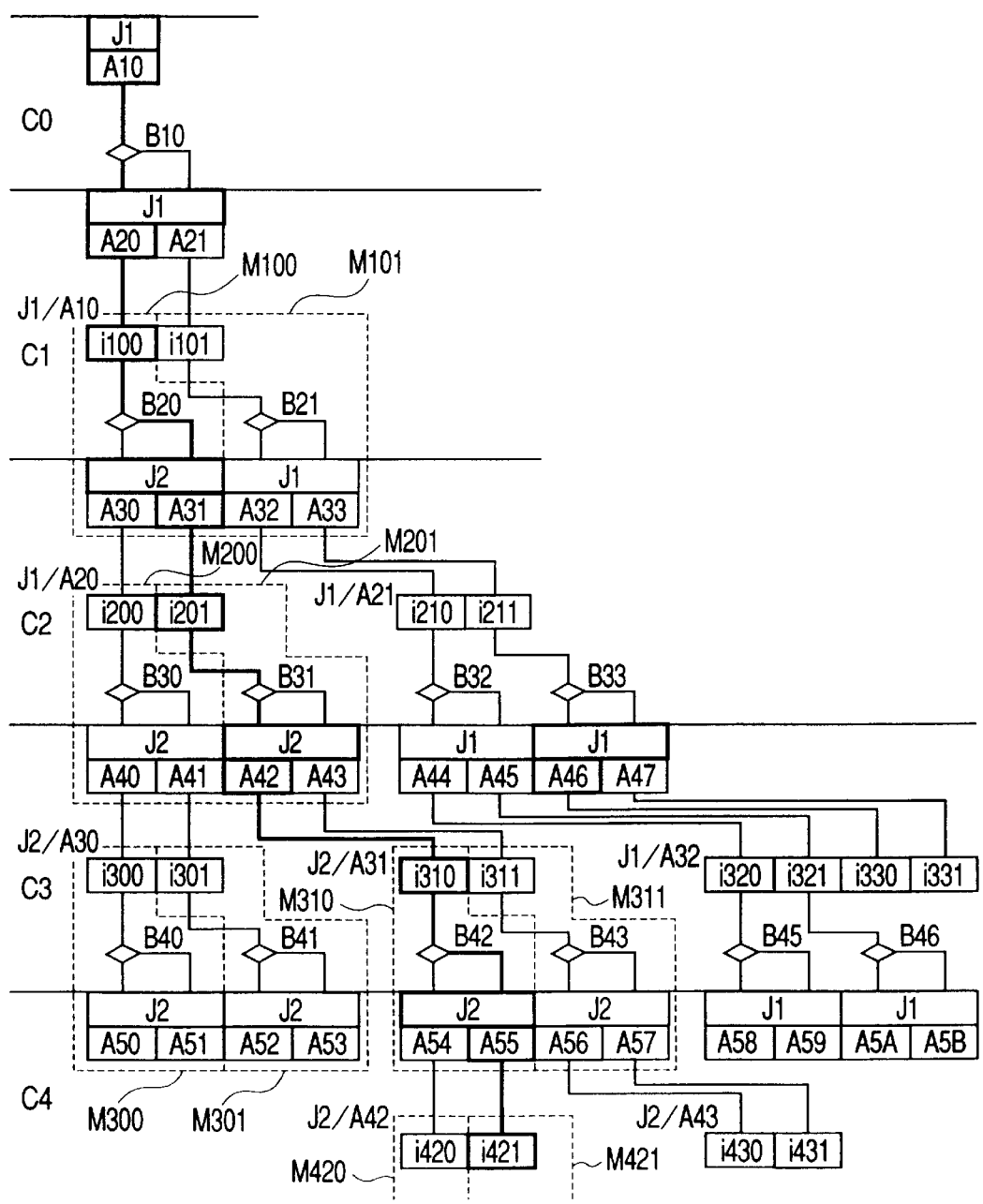
FIG. 16 shows a flow chart of the procedure of executing a micro instruction in second embodiment in accordance with the present invention.

Next, referring to the timing chart shown in FIG. 15 and the flow chart shown in FIG. 16, the operation and execution procedure of the micro program controller apparatus embodied by second embodiment in accordance with the present invention. In second embodiment of the present invention, as similar to first embodiment of the present invention, read/branch operation (for even cycle) and read/branch operation (for odd cycle) are performed in a pipeline. In FIG. 16, J indicates a block address, and A indicates a block relative address.

The read/branch operation (for even cycle) will be first described below in greater details.

In cycle (C-1), the start block address J1 and start block relative address A10 of a micro program stored in the start address register 1310 in the instruction fetch unit 30 is transferred to the read/branch unit 31. After the transfer the start block address J1 and the start block relative address A10 are input to the address selector 1321 and then stored in the address register 1313.

In cycle (C0), the start block address J1 and start block relative address A10 of the micro program stored in the address register 1313 specify a page in the control storage (block relative address) 1330a and a control storage (control+block address) 1330b to read out two micro instructions M100 and M101. The bank selector 1322 selects either one of the block relative address following the next cycle (bank 00) A30 or the block relative address following the next cycle (bank 10) A32 read out from the control storage (block relative address) 1330a. The bank selector 1323 selects either the block relative address following the next cycle (bank 01) A31 or block relative address following the next cycle (bank 11) A33 read out of the control storage (block relative address) 1330a; the bank selector 1324 selects either the set of block address following the next cycle J2 (bank 0) and control field i100 (bank 0) or the set of block address following the next cycle J1 (bank 1) and control field i101 (bank 1) both read out from the a control storage (control+block address) 1330b, to perform the branch operation B10. In this flow chart, the branch operation B10 selects the micro instruction M100, which is constituted of control field i100, block address following the next cycle J2 (bank 0), block relative address following the next cycle (bank D0) A30 and (bank 01) A31. After the branch operation B10, the block relative address following the next cycle (bank 00) A30 is stored in the next cycle address register (bank X0) 1314, the block relative address following the next cycle (bank 01) A31 is stored in the next cycle address register (bank X1) 1315, the control field i100 and the block address following the next cycle J2 (bank 0) are stored in the data register 1316. Depending on the design of apparatus, the branch operation B10 may be done in the following cycle (C1).

In cycle (C1), from within the block relative address following the next cycle (bank 00) A30 and (bank 01) A31, the block relative address following the next cycle (bank 01) A31 is selected by the bank selector 1325 to perform the branch operation B20. Then, the block relative address following the next cycle (bank 01) A31 selected by the branch operation B20 is input into the address selector 1321 and stored in the address register 1313. In parallel to this branch operation B20, the block address following the next cycle J2 (bank 0) stored in the data register 1316 is input into the address selector 1321 and then stored in the address register 1313, so that the control field i100 is transferred to the execution unit 32 to start execution. As can be seen from FIG. 16, the page address A30 and A31 specified by the micro instruction M100 possess both the same block address J2. Thereafter the read/branch operation (for even cycle) and execution will be performed in a similar manner. In this flow chart (shown in FIG. 16), the micro instruction selected by the read/branch operation (for even cycle) controls the execution unit in the order of i100 (cycle C1) and then i310 (cycle C3).

Now the read/branch operation (for odd cycle) will be described below in greater details.

In cycle (C0), two page addresses A20 and A21 stored in the second cycle block relative address register (bank 0) 1311 and second cycle block relative address register (bank 1) 1312 in the instruction fetch unit 30, and the block address J1 stored in the second cycle block address register 1317 are transferred to the read/branch unit 31. After the transfer the block relative page address A20 is selected by the bank selector 1320 from within two page address A20 and A21 (branch operation B10). Then, the page address A20 and block address J1 are input into the address selector 1321 and stored into the address register 1313. The read/branch operation will be performed thereafter in a manner similar to the read/branch operation (for even cycle) In the flow chart (shown in FIG. 16), the micro instruction selected by the read/branch operation (for odd cycle) controls the execution unit in the order of i201 (cycle C2), and i421 (cycle C4).

As a result, when combining the read/branch operation (for even cycle) together with the read/branch operation (for odd cycle) performed in a pipeline, the micro instruction controls the execution unit in the order i100 (cycle C1), i201 (cycle C2), i310 (cycle C3), then i421 (cycle C4), indicating that second embodiment in accordance with the present invention has the same execution procedure as the first Prior Art technology, second Prior Art technology, and first embodiment of the present invention.

In accordance with the present invention, the high speed performance comparable to the micro program control in accordance with the second Prior Art may be achieved, while at the same time the problem of increasing the amount of memory in the control storage for storing the micro programs may be remedied.

For example, when specifying an address in a micro instruction set to be read out in the cycle following the next, if the amount of the address field in a micro instruction was 20%, then second Prior Art technology would require twice of storage capacity as compared to first Prior Art technology; while on the other hand if the present invention is used the increase of amount of storage capacity will be 1.2 fold of the first Prior Art technology. In addition, when the present invention is applied only to the branch operation within blocks, the amount increased of the storage capacity of micro programs may be further reduced.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A micro program controller apparatus, comprising:

an instruction fetch means for controlling fetch of micro instructions by specifying a start address of a micro program; a read/branch means for controlling reading and branching of micro instructions in each cycle in accordance with the specified start address; and an executing means for executing the read micro instruction wherein said micro instructions includes either (N−1)th power of M of fields for specifying the micro instruction branch target address to be read out at following Nth (N≧2) cycle from the current read cycle or (N−1)th power of M of fields for determining the end of micro program at said following Nth cycle, and a field for controlling execution in the next cycle;

said instruction fetch means includes a first register means for storing said start address, and a second register means for storing information used in determining the micro instruction address to be read out in the following 2nd to Nth cycle after starting the micro program and the end of micro program in the following 2nd to Nth cycle after starting the micro program;

said read/branch means includes an end judgment means referring to an end judgment field of micro instruction of a preceding cycle for generating an end judgment signal of micro program, an address selector means referring to said end judgment signal for selecting either the starting address of micro program, or the micro instruction address to be read out in the following 2nd to Nth cycle after starting a micro program, or the branch target address at the following Nth cycle of said micro instruction having read out in the preceding cycle, a third register means for storing the selected addresses, a storage means having a first storage part for storing the field specifying the branch target address of said micro instructions in the following Nth cycle and the field for determining the end of micro instruction in the following Nth cycle, and a second storage part for storing a branch condition field of micro instructions and a control field, a reading means for reading the Mth (M≧2) micro instruction from one address stored in said third register means into said storage means, a branch judgment means for referring to the branch condition field of the micro instruction read out in the previous cycle and the execution result of the previous cycle to generate a branch judgment signal and a fourth register means for storing control information on the execution in the next cycle; and said execution means includes a means for performing the execution in the next cycle in accordance with said control information.

2. A micro program controller apparatus, comprising: an instruction fetch means for controlling fetch of micro instructions by specifying a start address of a micro program; a read/branch means for controlling reading and branching of micro instructions in each cycle in accordance with the specified start address; and an executing means for executing thus read micro instruction, wherein said micro instructions include a field for specifying a branch target block address of the micro instruction to be read out at the following Nth cycle (N≧2) from the current read cycle, a field for specifying a branch target address within the block of the micro instruction to be read out in the following Nth cycle, an end judgment field for determining the end of micro program in the following Nth cycle, and a control field for controlling execution in the next cycle;

said instruction fetch means includes a first register means for storing said start address ad a second register means for storing the micro instruction block address of the micro instruction to be read out in the following 2nd to Nth cycle after starting the micro program and a third register means for storing a block relative address offset within the block of micro instruction to be read out in the following 2nd to Nth cycle after starting the micro program, and information used in determining the end of micro program in the following 2nd to Nth cycle after starting the micro program;

said read/branch means includes an end judgment means referring to an end judgment field of micro instruction of a preceding cycle for generating an end judgment signal of micro program an address selector means for referring to said end judgment signal for selecting from among the starting address of micro program, the block relative address of the block specified by the block address of the micro instruction to be read out in the following 2nd to Nth cycle after starting a micro program, or the branch target address offset within the block of the block specified by the block address at the following Nth cycle of said micro instruction having read out in the preceding cycle a fourth register means for storing selected addresses a storage means for storing said micro instructions, having a first storage part for storing the field for specifying the branch target address of said micro instructions in the following Nth cycle and the field for determining the termination in the following Nth cycle, and a second storage part for storing a branch condition field of micro instructions containing said block address of micro instruction and a control field, a branch judgment means for referring to the branch condition field of the micro instruction read out in the previous cycle and the execution result of the previous cycle to generate a branch judgment signal and a fifth register means for storing control information on the execution in the next cycle;

said execution means includes a means for performing the execution in the next cycle in accordance with said control information.

3. A large-scale integrated circuit (LSI) for micro program control, comprising:

a first register means for storing a start address;

a second register means for storing information used in determining the micro instruction address to be read out in the following 2nd to Nth cycle after starting the micro program, and the end of micro program in the following 2nd to Nth cycle after starting the micro program;

an end judgment means referring to an end judgment field of micro instruction of a preceding cycle for generating an end judgment signal of micro program; an address selector means referring to said end judgment signal for selecting either the starting address of micro program, or the micro instruction address to be read out in the following 2nd to Nth cycle after starting a micro program, or the branch target address at the following Nth cycle of said micro instruction having read out in the preceding cycle;

a third register means for storing selected addresses;

a storage means having first storage part for storing the field specifying the branch target address of said micro instructions in the following Nth cycle and the field for determining the end of micro instruction in the following Nth cycle, and second storage part for storing a branch condition field of micro instructions and a control field;

a branch judgment means for referring to the branch condition field of the micro instruction read out in the previous cycle and the execution result of the previous cycle to generate a branch judgment signal;

a fourth register means for storing control information on the execution in the next cycle; and a means for performing the execution in the next cycle in accordance with said control information.

4. An LSI for micro program control, comprising:

on-chip instruction fetch means;

read/branch means; and instruction execution means; wherein said micro instructions include either (N−1)th power of M of fields for specifying the micro instruction branch target address to be read out at following Nth (N≧2) cycle from the current read cycle or (N−1)th power of M of fields for determining the end of micro program at said following Nth cycle, and a field for controlling execution in the next cycle;

said instruction fetch means includes a first register means for storing said start address, and a second register means for storing information used in determining the micro instruction address to be read out in the following 2nd to Nth cycle after starting the micro program, and the end of micro program in the following 2nd to Nth cycle after starting the micro program;

said read/branch means includes an end judgment means referring to an end judgment field of micro instruction of a preceding cycle for generating an end judgment signal of micro program, an address selector means referring to said end judgment signal for selecting either the starting address of micro program, or the micro instruction address to be read out in the following 2nd to Nth cycle after starting a micro program, or the branch target address at the following Nth cycle of said micro instruction having read out in the preceding cycle, a third register means for storing the selected addresses, a storage means having a first storage part for storing the field specifying the branch target address of said micro instructions in the following Nth cycle and the field for determining the end of micro instruction in the following Nth cycle, and a second storage part for storing a branch condition field of micro instructions and a control field, a reading means for reading M (M≧2) micro instruction from one address stored in said third register means into said storage means, a branch judgment means for referring to the branch condition field of the micro instruction read out in the previous cycle and the execution result of the previous cycle to generate a branch judgment signal, and a fourth register means for storing control information on the execution in the next cycle; and said instruction execution means include a means for performing the execution in the next cycle in accordance with said control information.

5. An LSI for micro program control, comprising:

an instruction fetch means for controlling fetch of micro instructions by specifying a start address of a micro program;

a read/branch means for controlling reading and branching of micro instructions in each cycle in accordance with the specified start address; and an executing means for executing thus read micro instruction;

said micro instructions include a field for specifying a branch target block address of the micro instruction to be read out at the following Nth cycle (N≧2) from the current read cycle, a field for specifying a branch target address within the block of the micro instruction to be read out in the following Nth cycle, an end judgment field for determining the end of micro program in the following Nth cycle, and a control field for controlling execution in the next cycle;

said instruction fetch means include a first register means for storing said start address, a second register means for storing the micro instruction block address of the micro instruction to be read out in the following 2nd to Nth cycle after starting the micro program, and a third register means for storing a block relative address offset within the block of micro instruction to be read out in the following 2nd to Nth cycle after starting the micro program, and information used in determining the end of micro program in the following 2nd to Nth cycle after starting the micro program;

said read/branch means include an end judgment means referring to an end judgment field of micro instruction of a preceding cycle for generating an end judgment signal of micro program, an address selector means for referring to said end judgment signal for selecting from among the starting address of micro program, the block relative address of the block specified by the block address of the micro instruction to be read out in the following 2nd to Nth cycle after starting a micro program, or the branch target address offset within the block of the block specified by the block address at the following Nth cycle of said micro instruction having read out in the preceding cycle, a fourth register means for storing selected addresses, a storage means for storing said micro instructions, having a first storage part for storing the field for specifying the branch target address of said micro instructions in the following Nth cycle and the field for determining the termination in the following Nth cycle, and a second storage part for storing a branch condition field of micro instructions containing said block address of micro instruction and a control field, a branch judgment means for referring to the branch condition field of the micro instruction read out in the previous cycle and the execution result of the previous cycle to generate a branch judgment signal, and a fifth register means for storing control information on the execution in the next cycle; and said execution means include means for performing the execution in the next cycle in accordance with said control information.

6. A computer readable recording medium storing a computer readable program for executing the method comprising the steps of:

providing micro instructions stored in a storage referred by a read/branch operation;

providing either (N−1)th power of M of fields for specifying the micro instruction branch target address to be read out at following Nth (N≧2) cycle from the current read cycle or (N−1)th power of M of fields for determining the end of micro program at said following Nth cycle;

providing a field for controlling execution in the next cycle;

reading out M (M≧2) micro instructions from one address of said storage and selecting a desired micro instruction from within the micro instructions having read out, and using said selected micro instruction to perform, in parallel, a control in said read/branch operation for determining the micro instruction address to be read out at the following Nth cycle within at most Nth cycle, and a control in said instruction, execution operation for performing the execution in the next cycle.

7. A computer readable recording medium storing a computer readable program for executing a method comprising the steps of:

providing an instruction fetch operation for controlling fetch of micro instructions by specifying a start address of a micro program, a read/branch operation for controlling reading and branching of micro instructions in each cycle in accordance with the specified start address, and executing operation for executing the micro instruction having read;

splitting said micro program into a plurality of blocks;

providing micro instructions stored in a storage referred by said read/branch operation, said instructions having a field for specifying a block address in which the micro instructions to be read out at Nth cycle (N≧2) from the current read cycle is present, said instructions having either (N−1)th power of M of fields for specifying the micro instruction branch target address of said micro instructions present in said block or (N−1)th power of M of fields for determining the end of micro program at said following Nth cycle, and having a field for controlling execution in the next cycle;

reading out M (M≧2) micro instructions from one address of said storage and selecting a desired micro instruction from within the micro instructions having read out; and using said selected micro instruction to perform in parallel: a control in said read/branch operation for determining the micro instruction address to be read out at the following Nth cycle within at most Nth cycle, and a control in said instruction execution operation for performing the execution in the next cycle.

8. A micro program controller apparatus, comprising:

a memory for storing pages and addresses corresponding to said pages respectively, each of said pages consisting of two micro instructions;

an instruction fetch means for controlling fetch of micro instructions by specifying a start address of a micro program;

a read/branch means for reading out said page from said memory according to said start address and performing branch process by selecting a micro instruction from the page and controlling succeeding said reading page or an end judgment based on a execution result and content of said micro instruction; and an execution unit for interpreting the content of said micro instruction to execute said micro instruction, wherein said micro instruction includes a branch address field specifying maximum two addresses of said page to be read out after two cycle than a present read out cycle, an end judgment field specifying maximum two end judgment flags that judge whether micro program ends after two cycle than a present read out cycle, a branch condition field specifying a branch judgment condition of next cycle of a present read out cycle, and a control field specifying control information that control an execution unit at next cycle of present read out cycle;

said instruction fetch unit includes a first register storing said start address, and a second register storing two branch addresses used at second cycle of said micro program and two said end judgment flags;

said read/branch means includes a branch judgment means generating a branch judgment signal according to said branch condition field of micro instruction read out in the preceding cycle and an execution result of preceding cycle, a first address selection means selecting one of branch addresses and one of end judgment flags stored in said second register according to said branch judgment signal, end judgment means generating end judgment signal of micro program according to said end judgment flag or end judgment flag of microinstruction read out in preceding cycle, second address selection means selecting either one of said start address, a branch address that said first address selection means selects, and branch address that micro instruction read out in preceding cycle, third register storing said address and specifying an address of page of said memory, branch address selection means selects one of four branch address read out said memory in two cycle according to said branch judgment signal, fourth register storing intermediate result of said branch address selection means, control information selection means selecting one of two control information read out from said memory in a read out cycle according to said branch judgment signal, and a fifth register storing said control information; and said execution unit executes the succeeding cycle of a read out cycle.

9. A micro-program controller apparatus, comprising:

a memory for storing pages and addresses corresponding to said pages respectively, each of said pages consisting of two micro instructions;

an instruction fetch means for controlling fetch of micro instructions by specifying a start address of a micro program;

a read/branch means for reading out said page from said memory according to said start address and performing branch process by selecting a micro instruction from the page and controlling succeeding said reading page or an end judgment based on a execution result and content of said micro instruction, and an execution unit for interpreting the content of said micro instruction to execute said micro instruction; wherein said micro instruction includes a branch address field specifying maximum (N−1) multiplication of two addresses of said page to be read out after N cycle than a present read out cycle an end judgment field specifying maximum (N−1) multiplication of two end judgment flags that judge whether micro program ends after N cycle after a present read out cycle, a branch condition field specifying a branch judgment condition of next cycle of a present read out cycle, and a control field specifying control information that control an execution unit at next cycle of present read out cycle;

said instruction fetch unit includes a first register storing said start address, and a second register storing maximum (N−1) multiplication of two branch addresses used at second cycle to Nth cycle of said micro program and (N−1) multiplication of two said end judgment flags;

said read/branch means includes a branch judgment means generating a branch judgment signal according to said branch condition field of micro instruction read out in the preceding cycle and an execution result of preceding cycle, a first address selection means selecting one of (N−1) multiplication of two branch addresses and one of (N−1) multiplication, of two end judgment flags stored in said second register according to said branch judgment signal, end judgment means generating end judgment signal of micro program according to said end judgment flag or end judgment flag of micro instruction read out in preceding cycle, second address selection means selecting either one of said start address, a branch address that said first address selection means selects, and branch, address that micro instruction read out in preceding cycle, third register storing said address and specifying an address of page of said memory, branch address selection means selects one of (N−1) multiplication of two branch address read out said memory in N cycle according to said branch judgment signal, fourth register storing intermediate result of said branch, address selection means, control information selection means selecting one of two control information read out from said memory in a read out cycle according to said branch judgment signal, and a fifth register storing said control information; and said execution unit executes succeeding cycle of a read out cycle.

10. A micro program control method, comprising the steps of:

storing pages and addresses corresponding to said pages respectively in a memory, each of said pages consist of two micro instructions;

controlling fetch of micro instructions by specifying a start address of a micro program in an instruction fetch means;

reading out said page from said memory according to said start address and performing branch process by selecting a micro instruction from the page and controlling succeeding said reading page or an end judgment based on a execution result and content of said micro instruction in a react/branch means; and interpreting the content of said micro instruction to execute said micro instruction in an execution unit, wherein said micro instruction includes a branch address field specifying maximum two addresses of said page to be read out after two cycle than a present read out cycle, an end judgment field specifying maximum two end judgment flags that judge whether micro program ends after two cycle than a present read out cycle, a branch condition field specifying a branch judgment condition, of next cycle of a present read out cycle, and a control field specifying control information that control an execution unit at next cycle of present read out cycle;

said instruction fetch process includes an initial address specifying process specifying said start address, said branch address used in second cycle of micro program and said end judgment flag;

said read/branch process includes an instruction selecting process selecting one of instructions read out from said memory in the read out cycle according to said branch condition field and execution result of micro instruction read out preceding cycle, an address selection process selecting one of maximum two branch addresses and one of maximum 2 end judgment flags in succeeding cycle according to said branch, condition field of the micro instruction and said execution result, and an end judgment process judging end of micro program according to said end judgment flag; and said execution process executes by interpreting said control field of micro instruction selected in the said instruction selecting process.

11. A micro program control method, comprising the steps of:

storing pages and addresses corresponding to said pages respectively in a memory, each of said pages consist of two micro instructions;

controlling fetch of micro instructions by specifying a start address of a micro program in an instruction fetch means;

reading out said page from said memory according to said start address and performing branch process by selecting a micro instruction from the page and controlling succeeding said reading page or an end judgment based on a execution result and content of said micro instruction in a read/branch means; and interpreting the content of said micro instruction to execute said micro instruction in an execution unit, wherein said micro instruction includes a branch address field specifying maximum two addresses of said page to be read out after two cycle than a present read out cycle, an end judgment field specifying maximum two end judgment flags that judge whether micro program ends after two cycle than a present read out cycle, a branch condition field specifying a branch judgment condition of next cycle of a present read out cycle, and a control field specifying control information that control an execution unit at next cycle of present read out cycle;

said instruction fetch process includes an initial address specifying process specifying said start address, said branch address used in second cycle to N of micro program and said end judgment flag;

said read/branch process includes an instruction selecting process selecting one of M instructions read out from said memory in the read out cycle according to said branch condition field and execution result of micro instruction read out preceding cycle, an address selection process selecting one of maximum (N−1) multiplication of M branch addresses and one of maximum (N−1) multiplication of M end judgment flags in succeeding cycle to N cycle according to said branch condition, field of the micro instruction and said execution result, and an end judgment process judging end of micro program according to said end judgment flag; and said execution process executes by interpreting said control field of micro instruction selected in the said instruction selecting process.

* * * * *